United States Patent [19]

Osanai

[11] 4,346,859
[45] Aug. 31, 1982

[54] TAPE RECORDER

[75] Inventor: Akira Osanai, Hachioji, Japan

[73] Assignee: Olympus Optical Co., Ltd., Tokyo, Japan

[21] Appl. No.: 142,243

[22] Filed: Apr. 21, 1980

[30] Foreign Application Priority Data

May 2, 1979 [JP] Japan .............................. 54-59087[U]
May 2, 1979 [JP] Japan .............................. 54-59088[U]

[51] Int. Cl.³ ........................ G03B 1/04; G11B 15/32
[52] U.S. Cl. ..................................... 242/201; 242/186
[58] Field of Search ............... 242/193, 194, 200–204, 242/67.4, 186; 40/486, 468, 469, 519; 192/41 R, 44, 45

[56] References Cited

U.S. PATENT DOCUMENTS 3,197,151  7/1965  Sparks et al. ................... 242/200 X
3,625,457 12/1971  Weidenhammer ................. 242/201

FOREIGN PATENT DOCUMENTS 50-10606   2/1975  Japan .
50-137007 11/1975  Japan .

Primary Examiner—Leonard D. Christian
Attorney, Agent, or Firm—Frishauf, Holtz, Goodman & Woodward

[57] ABSTRACT

A drive disk is constituted by a reel gear. A one-way clutch comprises a substantially circular clutch plate acting as a driven disk, along the periphery of which vortically shaped notches are equiangularly arranged. Magnetic balls of the one-way clutch are received in a space defined between the reel gear and driven disk. The balls are always attracted by a magnetic member such as a permanent magnet so as to be pressed against the reel gear.

5 Claims, 6 Drawing Figures

TAPE RECORDER

BACKGROUND OF THE INVENTION

This invention relates to a tape recorder and more particularly to a tape recorder comprising a reel mechanism provided with a pair of one-way clutches. Various types of tape recorders are known in which the rewind of a magnetic tape is carried out by causing a takeup reel to act as a supply reel and also a supply reel to act as a takeup reel through the slide of an idler. However, a tape recorder using an idler has the drawback that an idler changeover mechanism is required, enlarging the size of the tape recorder and complicating its arrangement. To eliminate this drawback, a tape recorder reel mechanism has been proposed which utilizes a one-way clutch. With a tape recorder reel mechanism provided with a one-way clutch, balls made of, for example, steel are disposed in a space defined between a drive disk and driven disk such as a clutch plate, on the periphery of which vortically shaped notches are formed. The rotation moment of a motor is transmitted from the drive disk to the driven disk by means of the balls. The tape recorder has to be properly operated even in an inclined state, or, in an extreme case, even in an overturned state. With the known tape recorder, the balls which are set free gravitationally roll on to abut against the periphery of the driven disk, possibly failing to act as frictional members in a space defined between the drive and driven disks. Further with the conventional tape recorder, the rotation moment of the motor is transmitted to the drive disk by means of an endless belt. However, the endless belt has the drawback that it should have a prescribed thickness, presenting difficulties in reducing the thickness of a reel mechanism and moreover is handicapped by unsatisfactory temperature characteristic.

SUMMARY OF THE INVENTION

It is accordingly an object of this invention to provide a tape recorder free from the above-mentioned drawbacks accompanying the prior art.

The above and further objects and novel features of the invention will become more apparent from the following detailed description when the same is read in connection with the accompanying drawing. It is to be expressly understood, however, that the drawing is for the purpose of illustration only and is not intended as a definition of the limits of the invention.

DETAILED DESCRIPTION OF THE PREFERRED EMBODIMENT

There will now be described by reference to the accompanying drawing a tape recorder according to this invention.

Figure 1:
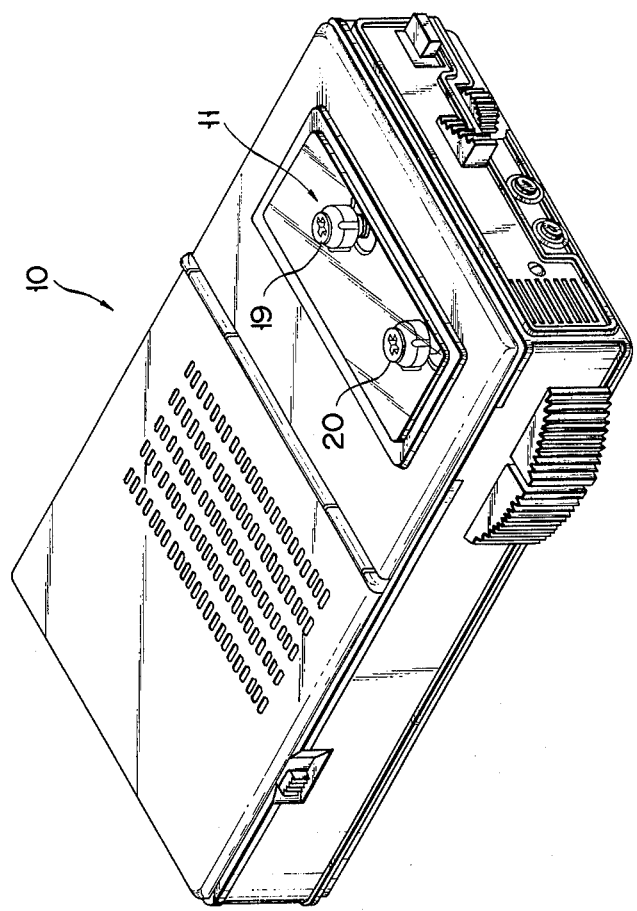
FIG. 1 is a schematic perspective view of a tape recorder embodying this invention.

FIG. 1 is a schematic perspective view of a tape recorder embodying this invention which is provided with a reel mechanism 11. The reel mechanism comprises a pair of reels 12, 112.

Figure 4:
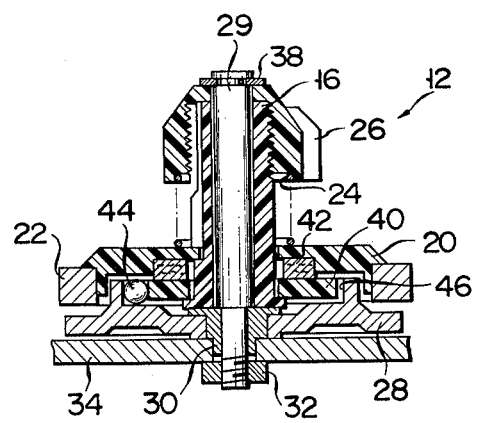
FIG. 4 is a longitudinal sectional view of the reel shown in FIG. 3.

Obviously, the reels 12, 112 respectively act as a supply reel or takeup reel in accordance with the direction in which the motor is driven. Description is given of the construction of the reel 12 which acts as a supply reel at the forward run of a magnetic tape. As seen from FIGS. 3 and 4, the reel 12 comprises a flanged hollow reel shaft 16 whose upper portion is threaded and provided with an axially extending slit 15 and a reel rest 20 which is provided with a key 17 engageable with the slit 15 and is fitted to the reel shaft 16 by means of a one-way clutch 18. The periphery of the reel rest 20 is fitted with a magnetic material such as a magnetic ring 22, on the surface of which, for example, the N and S poles are alternately provided in the circumferential direction. A magnetism-sensitive element 23 (FIG. 2) capable of sensing variations in the magnetic force of the magnetic ring 22 is disposed closely adjacent to the magnetic ring 22. A drive pawl 26 is threadedly engaged with the external thread section of the hollow reel shaft 16 by means of a compression spring 24. The hollow reel shaft 16 is loosely fitted around a gear shaft 29 of a reel gear 28 which acts as a drive disk constituting part of the later described motive power-transmitting mechanism 33. The reel gear 28 is fixed to the gear shaft 29 by means of a collar 30. A nut 32 is threadedly engaged with the external thread section of the lower end portion of the gear shaft 29, thereby securely fitting the reel 12 to a chassis 34. A snap ring 38 is fitted to an annular groove 36 formed at the free end of the gear shaft 29.

The one-way clutch 18 comprises a clutch plate 40 whose periphery is provided with, for example, three vortically shaped equiangularly arranged notches 39, and which acts as a driven disk, a felt plate 42 disposed between the clutch plate 40 and reel rest 20, and three magnetically attractable balls 44 formed of, for example, steel which are respectively received in the three vortically shaped notches 39. The steel balls 44 are each made with a size that they can loosely move through a space defined between the inner perspective wall 46 of the reel gear 28 and the clutch plate 40. A reel 112 acting as a takeup reel at the forward run of the tape, as seen from FIG. 2, has substantially the same construction as the previously discribed reel 12 acting as, for example, a supply type, except that three vortically shaped notches 139 of a clutch plate 140 are arranged in a direction opposite to that in which the vortically shaped notches 39 of the reel 12 are arranged. The component parts of the takeup reel 112 are designated by reference numerals formed by adding a number of 100 to those of the component parts of the supply reel 12.

Figure 2:
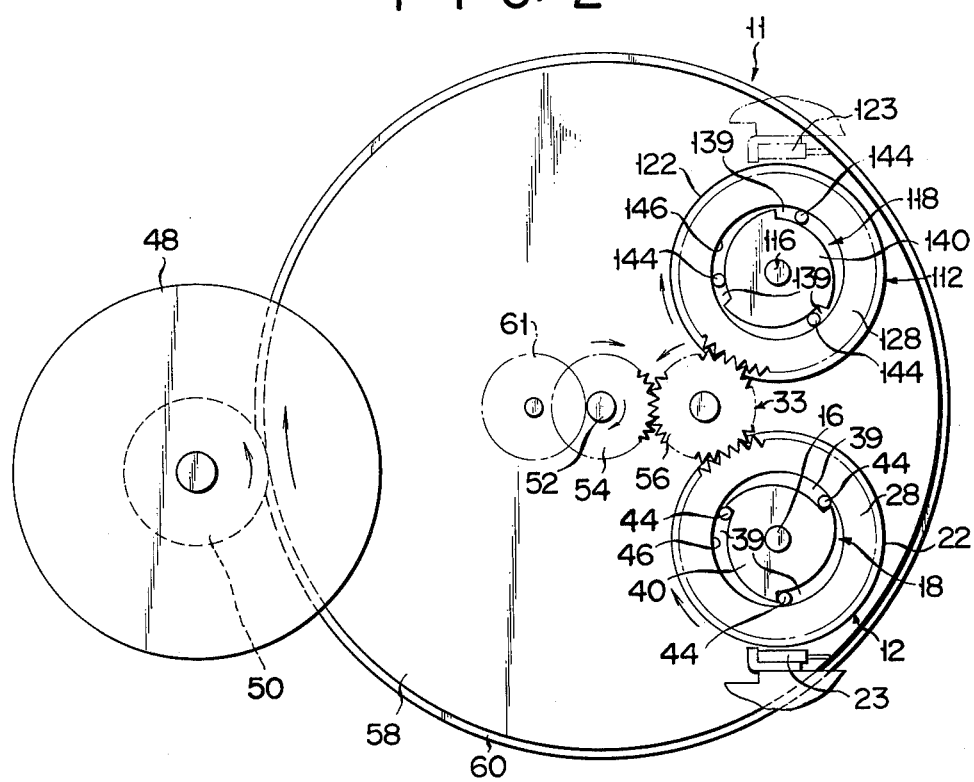
FIG. 2 is a schematic top plan view showing the relationship of the motive power-transmitting mechanism and reel mechanism of the tape recorder of FIG. 1.
Figure 3:
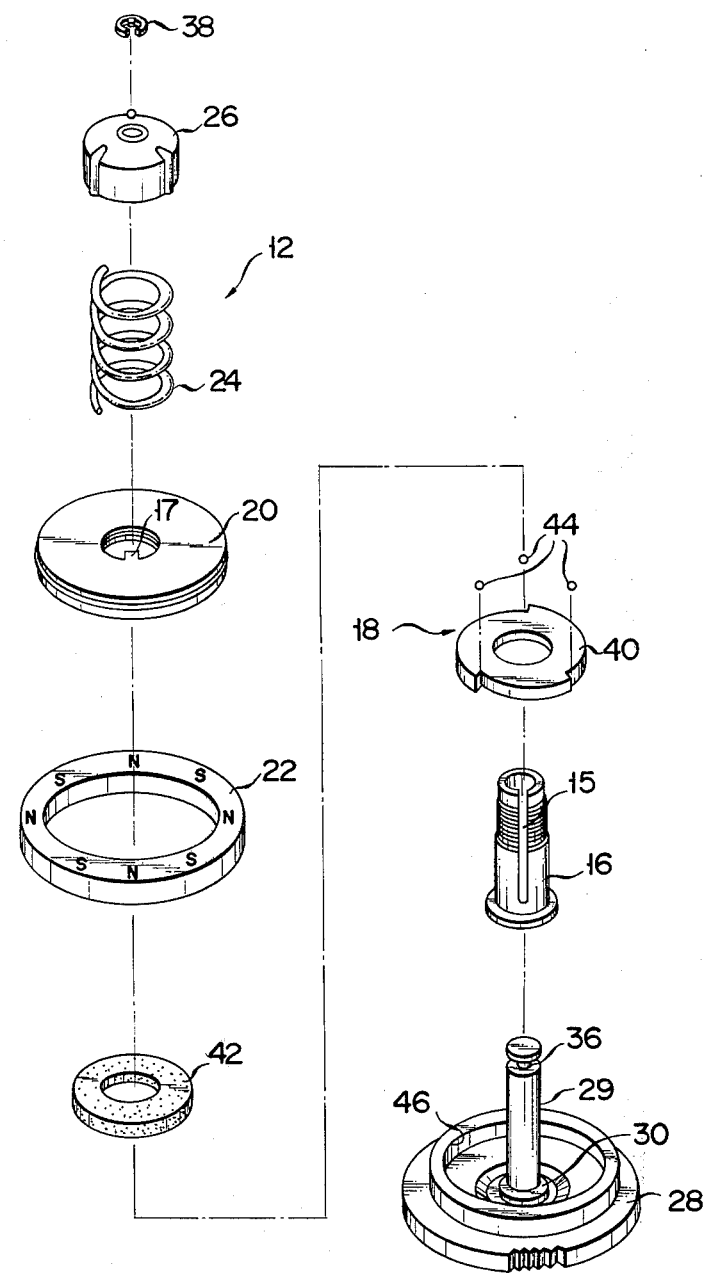
FIG. 3 is an exploded perspective view of one of the reels constituting the reel mechanism.

The rotation moment of a motor 48 is transmitted from a motor pulley 50 to a capstan shaft 52 and reel shafts 16, 116 by means of the motive power-transmitting mechanism 33, instead of being conducted through, for example, an idler lever as is the case with the conventional tape recorder. As shown in FIG. 2, the motive power-transmitting mechanism 33 comprises a capstan gear 54 fitted to a capstan shaft 52, a pair of reel gears 28, 128 respectively fitted to the reel shafts 16, 116, and an intermediate gear 56 simultaneously engageable with the reel gear 54 and the paired reel gears 28, 128. A flywheel 58 fixed to the capstan shaft 52 is frictionally engaged with the motor pulley 50. The rotation moment of the motor 48 is transmitted from the motor pulley 50 to the capstan shaft 52 by means of the flywheel 58 and further to the reel gears 28, 128 by means of the capstan gear 54, and intermediate gear 56. The rim of the flywheel 58 is fitted with a rubber tire 60 to insure frictional engagement between the flywheel 58 and motor pulley 50. Reference numeral 61 denotes a pinch roller.

Where the motor pulley 50 of the motor 48 is rotated counterclockwise of FIG. 2, then the capstan shaft 52 and reel gears 28, 128 are all rotated clockwise. When, with the reel 12, the reel gear 28 is rotated clockwise, the steel balls 44 slide toward a large space along the inner peripheral wall 46 of the reel gear 28 and idly roll in a space defined between the inner peripheral wall 46 and clutch plate 40, giving rise to no friction between the inner peripheral wall 46 and clutch plate 40. As a result, the reel rest 20, reel shaft 16 and drive pawl 26 are not rotated.

In contrast, with the takeup reel 112, the steel balls 144 slide toward a smaller space along the inner peripheral wall 146 of the reel gear 128 to take a wedging action, thereby giving rise to a friction between the inner peripheral wall 146 and clutch plate 140. Therefore, the clutch plate 140 is rotated clockwise. The clockwise rotation of the clutch plate 140 causes the reel rest 120 to be rotated by means of the felt plate 142, thereby enabling the reel 112 to take up the magnetic tape.

When the motor pulley 50 is rotated clockwise (not shown), then the clutch plate 40 and reel rest 20 are rotated, enabling the reel 12 to take up the magnetic tape by an operation reversed from that described above. The magnetic ring 22 is fitted to the reel rest 20 on the outside of the inner peripheral wall 46 of the reel gear 28. Accordingly, the magnetically attractable steel balls 44 are always pressed against the inner peripheral wall 46 of the reel gear 28. Therefore, when the tape recorder is inclined or overturned, the steel balls 44 never fail to effectively act as frictional members insuring the proper action of a one-way clutch.

Figure 5:
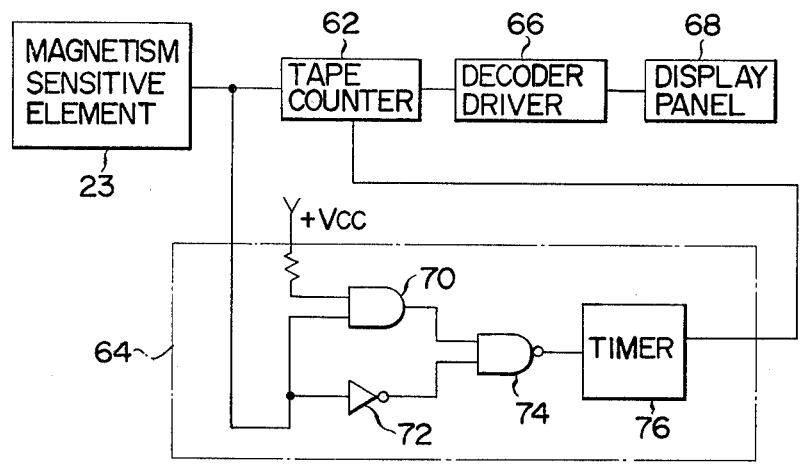
FIG. 5 is a block diagram of a circuit arrangement in which pulse signals are supplied to a tape counter.

The magnetism-sensitive element 23 generates pulses at a fixed period in response to variations in the magnetic force of the magnetic ring 22 on the surface of which the S and N poles are alternately arranged in the circumferential direction. When the run of a magnetic tape is brought to an end and no change takes place in the magnetic force of the magnetic ring 22, then the magnetism-sensitive element 23 continues to produce pulses having a fixed level. FIG. 5 is a block diagram of a circuit arrangement in which pulses sent forth from the magnetism-sensitive element 23 are supplied to not only a tape counter 62, but also a tape end-detecting circuit 64. The pulses conducted to the tape counter 62 are converted into binary codes. These codes are decoded into 7-segment display signals by a decoder-driver 66. The decoded signals are delivered to a display panel 68. Signals carried to the tape end-detecting circuit 64 pass through an AND gate 70 and inverter 72 and processed by a NAND gate 74. While pulses having a specified period corresponding to the number of rotations of the magnetic ring 22 are generated, a timer 76 does not issue a reset signal to the tape counter 62. When, however, the run of a magnetic tape is brought to an end and the magnetic ring 22 ceases to be rotated and thereafter pulses continue to be produced for a certain length of time, then the timer 76 issues a reset signal to the tape counter 62. At this time, the display panel indicates zero.

When, as described above, the magnetic ring 22 is fitted to the reel rest 20 rotated jointly with the reel shaft 16, then pulses sent forth from the magnetic ring 22 can be used not only to detect the termination of a tape run but also as input signals to the tape counter 62. Therefore, the tape counter 62 can reliably indicate the run of the magnetic tape, and moreover be unfailingly reset at the detection of pulses which are generated with a specified level at the end of a tape run.

With the foregoing embodiment, a magnetic member such as the magnetic ring 22 is fitted to both reels 12, 112. However, the magnetism-sensitive element 23 well serves the purpose, if it is set adjacent to either of the magnetic rings 22, 122. With the indicated embodiment, the magnetism-sensitive element 23 is disposed adjacent to the magnetic ring 22. As shown in dot-dash line in FIG. 2, however, a magnetism-sensitive element 123 may be set adjacent to the magnetic ring 122 of the reel 112 in place of the above-described magnetism-sensitive element 23.

Figure 6:
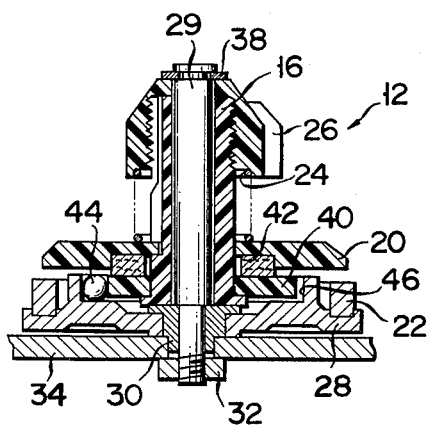
FIG. 6 is a longitudinal sectional view of a reel comprising a reel gear whose periphery is fitted with a magnetic ring.

With a mechanical counter, for example, which does not use an assembly of the magnetic ring 22 and magnetism-sensitive element 23 as a pulse-generating source, the magnetic ring 22 may be fitted to the reel gear 28 instead of the reel rest 20 as shown in FIG. 6.

As described above, the magnetic member is so positioned that the magnetically attractable balls of the one-way clutch always press against the reel gear 28 or 128 acting as a drive disk. Therefore, this invention provides a tape recorder comprising a reel mechanism in which magnetically attractable balls are always pressed against the drive disk independently of gravity, and which is provided with a pair of one-way clutches whose operation is not affected by the position in which a tape recorder is used. Further, the reel gear is used as a drive disk. Since a thin gear can be used with the present invention and an endless belt is omitted, a tape recorder embodying the invention does not raise any problem with respect to temperature characteristic. Consequently, it is possible to provide a compact, thin tape recorder which can be satisfactorily used in a frigid or hot zone. A magnetic member such as the magnetic ring is fitted to the reel rest which is rotated jointly with the reel shaft. An assembly of the magnetic ring and the magnetism-sensitive element sensing variations in the magnetic force of the magnetic ring 22 can be applied as a generator of pulses used not only to detect the end of a tape run but also as input signals to a tape counter. Accordingly, this invention provides a more simplified and compact tape recorder than has been possible in the past.

What is claimed is:

1. In a tape recorder which comprises a reel mechanism including a drive disk, a driven disk and a one-way clutch coupled between the disks for transmitting a drive force from the drive disk to the driven disk, the one-way clutch being provided with vortically shaped notches and balls loosely slidable through the notches, the improvement wherein:
the drive disk comprises a reel gear;

the balls of the one-way clutch are made of a magnetically attractable material; and a magnetic member is provided near the balls of the one-way clutch for magnetically attracting the balls of the one-way clutch in such a direction that the balls are always pressed against the reel gear.

2. The tape recorder according to claim 1, wherein the magnetic member comprises a permanent magnet coupled to the reel gear.

3. In a tape recorder which comprises a reel mechanism capable of transmitting a drive force from a drive disk to a driven disk through a one-way clutch provided with vortically shaped notches and balls loosely slidable through the notches, the reel mechanism including a reel rest and a reel shaft, the improvement wherein:
the drive disk comprises a reel gear;
the balls of the one-way clutch are made of magnetically attractable material;
a magnetic member is provided for magnetically attracting the balls of the one-way clutch so that the balls are always pressed against the reel gear;
the magnetic member comprising a magnetic ring which is fitted to the reel rest rotatable with the reel shaft of the reel mechanism, the magnetic ring having on the surface thereof S and N poles which are alternately provided in the circumferential direction of the magnetic ring;
a magnetism-sensitive element is provided and is set closely adjacent to the magnetic ring and which generates pulses at a fixed period when detecting variations in the magnetic force of the magnetic ring when the magnetic ring rotates with the reel shaft of the reel mechanism; and
a tape counter is coupled to count the pulses generated by the magnetism-sensitive element.

4. In a tape recorder which comprises a reel mechanism capable of transmitting a drive force from a drive disk to a driven disk through a one-way clutch provided with vortically shaped notches and balls loosely slidable through the notches, the reel mechanism including a reel rest and a reel shaft, the improvement wherein:
the drive disk comprises a reel gear;
the balls of the one-way clutch are made of magnetically attractable material;
a magnetic member is provided for magnetically attracting the balls of the one-way clutch so that the balls are always pressed against the reel gear;
the magnetic member comprising a magnetic ring which is fitted to the reel rest rotatable with the reel shaft of the reel mechanism, the magnetic ring having on the surface thereof S and N poles which are alternately provided in the circumferential direction of the magnetic ring;
a magnetism-sensitive element is provided and is set closely adjacent to the magnetic ring and which generates pulses at a fixed period when detecting variations in the magnetic force of the magnetic ring when the magnetic ring rotates with the reel shaft of the reel mechanism; and
a tape end-detecting circuit is coupled to receive the pulses generated by the magnetism-sensitive element for detecting a tape end when pulses having a fixed level are produced for a given length of time when a tape run is brought to an end.

5. In a tape recorder which comprises a reel mechanism capable of transmitting a drive force from a drive disk to a driven disk through a one-way clutch provided with vortically shaped notches and balls loosely slidable through the notches, the reel mechanism including a reel rest and a reel shaft, the improvement wherein:
the drive disk comprises a reel gear;
the balls of the one-way clutch are made of magnetically attractable material;
a magnetic member is provided for magnetically attracting the balls of the one-way clutch so that the balls are always pressed against the reel gear;
the magnetic member comprising a magnetic ring which is fitted to the reel rest rotatable with the reel shaft of the reel mechanism, the magnetic ring having on the surface thereof S and N poles which are alternately provided in the circumferential direction of the magnetic ring;
a magnetism-sensitive element is provided and is set closely adjacent to the magnetic ring and which generates pulses at a fixed period when detecting variations in the magnetic force of the magnetic ring when the magnetic ring rotates with the reel shaft of the reel mechanism; and
a tape counter and tape end-detecting circuit are provided and which receive the pulses generated by the magnetism-sensitive element, the tape end-detecting circuit sending forth a reset signal to the tape counter when pulses having a fixed level are produced for a given length of time when a tape run is brought to an end.

* * * * *